US011010715B2

(12) United States Patent
Brisebois et al.

(10) Patent No.: US 11,010,715 B2
(45) Date of Patent: May 18, 2021

(54) METHOD AND SYSTEM FOR REAL TIME RECORDS FROM AGGREGATED MOBILE DATA

(75) Inventors: Mitch A. Brisebois, Wakefield (CA); Arjun Mehta, Calgary (CA); Kevin McGuire, Kanata (CA); Cyril Soga, Orleans (CA)

(73) Assignee: ProntoForms Inc., Ottawa (CA)

( * ) Notice: Subject to any disclaimer, the term of this patent is extended or adjusted under 35 U.S.C. 154(b) by 316 days.

(21) Appl. No.: 12/522,692

(22) PCT Filed: Jan. 11, 2008

(86) PCT No.: PCT/IB2008/000056
§ 371 (c)(1),
(2), (4) Date: Jul. 9, 2009

(87) PCT Pub. No.: WO2008/084388
PCT Pub. Date: Jul. 17, 2008

(65) Prior Publication Data
US 2010/0023531 A1 Jan. 28, 2010

Related U.S. Application Data

(60) Provisional application No. 60/880,176, filed on Jan. 12, 2007.

(51) Int. Cl.
*G06F 16/30* (2019.01)
*G06Q 10/10* (2012.01)
*H04L 29/08* (2006.01)

(52) U.S. Cl.
CPC ............ *G06Q 10/10* (2013.01); *H04L 67/02* (2013.01)

(58) Field of Classification Search
CPC ...................................... G06Q 10/10
USPC ............................................. 707/10
See application file for complete search history.

(56) References Cited

U.S. PATENT DOCUMENTS

| 6,698,021 B1 | 2/2004 | Amini et al. |
| 7,109,882 B2 | 9/2006 | Angelis et al. |
| 7,130,812 B1 | 10/2006 | Iyer et al. |
| 7,327,280 B2 | 2/2008 | Bachelder et al. |
| 2002/0002627 A1* | 1/2002 | Stead ............ H04L 29/06 709/250 |
| 2002/0069037 A1* | 6/2002 | Hendrickson ...... H04L 41/12 702/186 |

(Continued)

FOREIGN PATENT DOCUMENTS

| DE | 101 12 258 | 9/2002 |
| DE | 10 2005 016 731 | 10/2006 |

OTHER PUBLICATIONS

Article entitled "Rogers mobilized field workers with mForms", by Guzman, dated Nov. 16, 2005.*

(Continued)

*Primary Examiner* — Mahesh H Dwivedi
(74) *Attorney, Agent, or Firm* — Stratford Managers Corporation

(57) ABSTRACT

A method and system for providing real-time display of data collected and submitted via mobile devices. An example method includes collecting data in a data record by the mobile device. The collected data record is submitted to a remote server. At least some of the data in the collected data record is displayed in real-time relative to the submission of the collected data record via an interface.

18 Claims, 7 Drawing Sheets

(56) References Cited

U.S. PATENT DOCUMENTS

| | | |
|---|---|---|
| 2002/0072785 A1 | 6/2002 | Nelson et al. |
| 2002/0128036 A1* | 9/2002 | Yach et al. .................... 455/552 |
| 2002/0184170 A1* | 12/2002 | Gilbert ................. G06F 16/958 706/20 |
| 2002/0188522 A1 | 12/2002 | McCall et al. |
| 2004/0049345 A1* | 3/2004 | McDonough .......... G06Q 10/10 702/12 |
| 2004/0078578 A1* | 4/2004 | Khandelwal ........... G06Q 30/02 713/185 |
| 2005/0004885 A1* | 1/2005 | Pandian .................. G06F 16/25 |
| 2005/0088517 A1* | 4/2005 | Hsuan .............................. 348/61 |
| 2005/0132016 A1 | 6/2005 | Boone |
| 2005/0182650 A1* | 8/2005 | Maddox, Jr. ........... G06Q 10/06 705/305 |
| 2006/0085543 A1* | 4/2006 | Hrastar et al. ................. 709/224 |
| 2006/0161646 A1* | 7/2006 | Chene ................... G06F 17/243 709/223 |
| 2006/0258339 A1 | 11/2006 | Connelly et al. |
| 2007/0124437 A1* | 5/2007 | Chervets ............ H04L 41/0681 709/223 |
| 2007/0199076 A1 | 8/2007 | Rensin et al. |
| 2010/0299376 A1* | 11/2010 | Batchu .............. G06F 16/24573 707/805 |
| 2013/0281071 A1* | 10/2013 | Fellingham ............. H04W 4/16 455/414.1 |

OTHER PUBLICATIONS

Article entitled "Mobility vendors seek to replace field workers' clipboards", by Lysecki, dated Nov. 16, 2005.*

International Search Report dated Jun. 4, 2008 which issued in corresponding International Patent Application No. PCT/IB2008/000056 (3 pages).

Written Opinion dated Jun. 4, 2008 which issued in corresponding International Patent Application No. PCT/IB2008/000056 (4 pages).

European Search Report, Application No. 08702220.8-1958, dated Feb. 28, 2017, (6 pages).

European Search Report, Application No. 08702220.8-1958, dated Jun. 11, 2013, (9 pages).

* cited by examiner

US 11,010,715 B2

METHOD AND SYSTEM FOR REAL TIME RECORDS FROM AGGREGATED MOBILE DATA

CLAIM OF PRIORITY AND RELATED APPLICATIONS

This application is a U.S. national stage filing of International Application No. PCT/IB2008/000056 filed Jan. 11, 2008 and this application claims priority to the International Application No. PCT/IB2008/000056, filed Jan. 11, 2008 and U.S. Provisional Application No. 60/880,176, filed Jan. 12, 2007 to the same inventors and hereby incorporates by reference those applications in their entirety.

FIELD OF THE INVENTION

The present invention relates generally to mobile device data analysis and, more particularly, to a system and method for providing real-time records from aggregated mobile device data collection.

BACKGROUND OF THE INVENTION

Traditionally, most data in field force industries (e.g., field sales, field services, inspection and reporting, etc.) is distributed and captured on paper-based forms. The data entered on paper-based forms was typically returned to the business office to be manually entered electronically and integrated with a back office system. Furthermore, an enterprise business process might require the captured data to be reviewed by other members of the organization (e.g., authorization, up sell opportunity, billing, etc.) before, during, or after the field has interacted with the data. The process of distributing, updating, capturing, and returning form data and adapting it to a unique business process applies to a large number of mobile workers performing a variety of tasks such as, but not limited to, data collection solutions for inspections (e.g., property, health, etc.), field sales solutions reporting (e.g., lead capture, timesheet, expense reports, etc.), and field services solutions such as work order dispatches (e.g., HVAC, insurance claims, etc.)

Typically, in more complex forms-based business processes, work requests and form data are initially dispatched to field force workers using a voice channel (e.g., cell phone) or pre-printed paper forms (e.g., clipboard) that is then manually filled out or updated by the mobile worker (e.g., technician). A completed work request might also require one or many subsequent requests (e.g., required parts, required authorization, up-sell opportunities, etc.) that are typically done through a call over a cellular phone, or return trip to the office, or may cause the displacement of the mobile worker. In addition, field inspectors may also capture data in the field using a series of paper forms and binders to complete their inspection tasks, resulting in a slow and inefficient process.

Businesses incur high wireless voice and vehicle fleet costs due to the above-described processes used in dispatching field workers, capturing or updating form data, and completing work orders or inspection forms in the field. Additionally, there are significant costs and inefficiencies with slow, manual processes for the exchange of data using paper-based forms, from the cost of the paper based forms, to duplicate data entry, to errors made in data capture on paper, to waiting for the person with the data to update another person or system, etc.

In order to reduce the use of paper, electronic forms may be used in conjunction with mobile devices such as portable computers. However such electronic forms and XForms (XML Forms) solutions (such as, Adobe LiveCycle, Microsoft Infopath, FormDocs, Altova, Advantys, MDSI, X-Smiles, formsPlayer, and Novell XForms) are generally PC-centric and Local Area Network (LAN) oriented as opposed to being optimized for mobile devices and wireless use. Additionally, these solutions are on-line and browser-centric, as opposed to being optimized for on- and off-line use over intermittently connected wireless networks with varying degrees of cost and quality of service. These solutions typically do not provide mechanisms for hosting multi-tenants (multi-domain) forms applications using a common IT infrastructure (e.g., Managed Service Provider hosted environment), nor do they have support for sophisticated routing and tracking of forms and policies that define a mobile forms application.

Currently, mobile devices (e.g., laptops, cell phones, PDAs, tablet PCs, Ultra Mobile PCs, etc.) are increasingly used to collect data using mobile applications, such as those produced by the mXDesigner tool available from TrueContext of Ottawa, Canada. Using connectivity of mobile devices, the data collected may be transmitted to a central location including a file system. However, mobile data is currently not aggregated and reported in real-time. Usually, mobile data is gathered and sent at predetermined intervals (i.e., once a day) or synchronized to back-end databases where it can then later be extracted and transformed into data records. If data is transmitted in real-time from the mobile devices, the transmitted data simply feeds into a data repository such as a server for later analysis. The current systems thus create an issue of time delay for organizations with a mobile workforce who rely on business processes requiring timely and secure exchange of data.

Thus, there is a need for a real-time interface to view data collected from mobile devices. There is a further need for a system allowing a user easy access via a web based interface for real-time updates of collected mobile data. There is another need for a graphically based interface to display data collected by mobile applications, data relating to mobile device performance metrics, or data relating to mobile device users.

SUMMARY OF THE INVENTION

One disclosed example is a method for displaying real-time data collected from a first mobile device. The method includes collecting data in a first data record by the first mobile device. The collected first data record is submitted to a remote server. The collected first data record is displayed in real-time relative to the submission of the collected first data record via an interface.

Another disclosed example is a system of obtaining real-time data from a mobile device. The system includes a first mobile device to collect data in a first data record, the first mobile device including a communication interface. A remote server is in communication with the first mobile device to accept submission of the collected first data record. An interface is in communication with the data server to display at least some of the data in the collected data record in real-time relative to the submission of the collected first data record.

Another disclosed example is an interface to display real-time data from at least one mobile device. The mobile device collects data and submits a data record including the data. The interface includes a display showing at least some of the data included in previously submitted data records. An update mechanism is included to update the display to include at least some of the data in the data record at the time the data record is submitted.

Another disclosed example is a method for displaying real-time data collected from a mobile device. Data is collected by the mobile device. The collected data is submitted to a remote server. The collected data is displayed in real-time relative to the submission of the collected data via an interface.

Another disclosed example is an article of manufacture for displaying real-time collection of data by at least one mobile device. The article of manufacture includes a computer readable medium and a plurality of instructions wherein at least a portion of said plurality of instructions are storable in said computer readable medium. The plurality of instructions are configured to cause a processor to accept a data record including data collected by a mobile device and submitted by the mobile device. The instructions also cause the processor to display at least some of the data in the collected first data record in real-time relative to the submission of the collected first data record.

The above summary of the present invention is not intended to represent each embodiment, or every aspect, of the present invention. Additional features and benefits of the present invention are apparent from the detailed description, figures, and claims set forth below.

Figure 1:
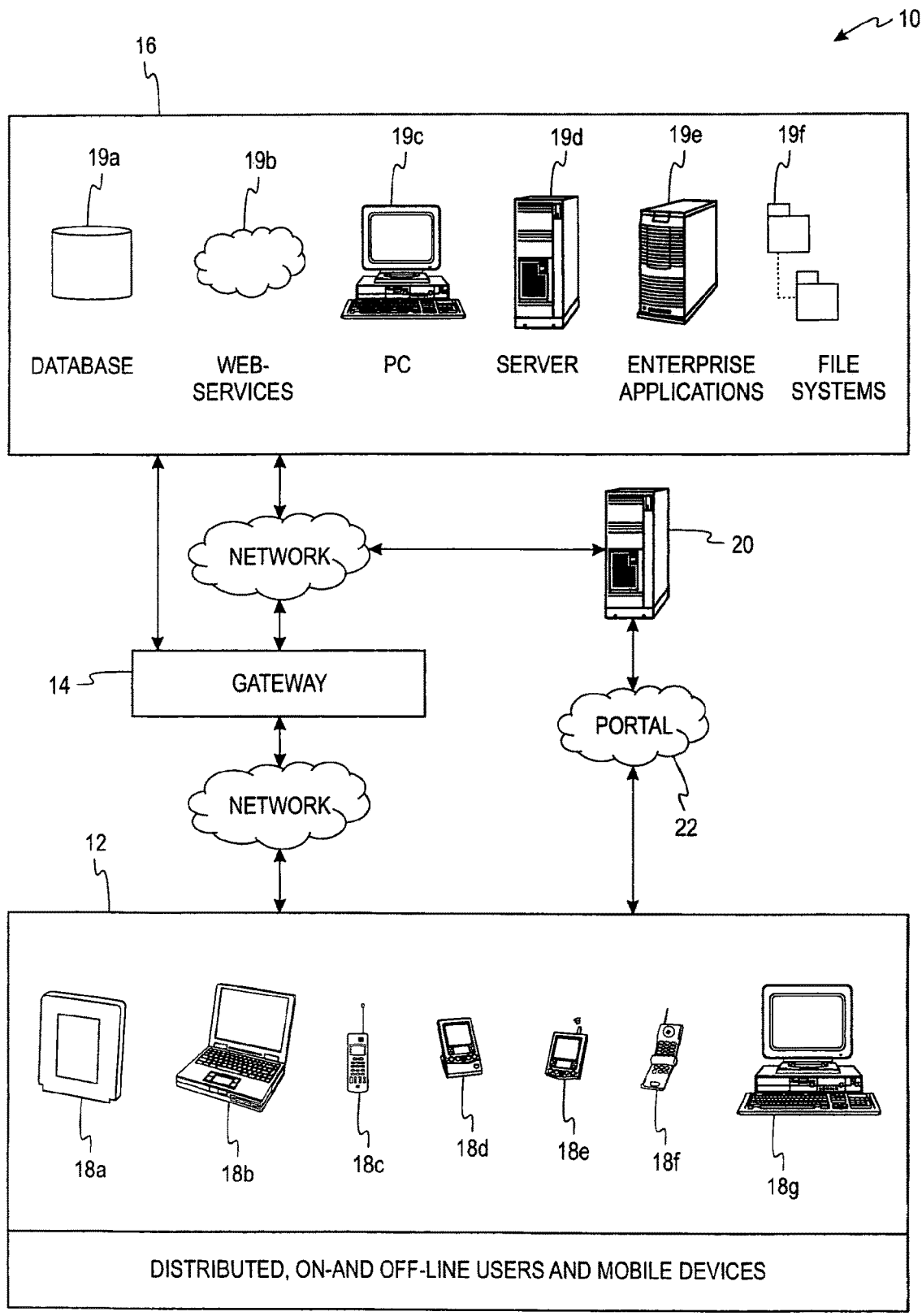
FIG. 1 is an illustration of a mobile device data collection system, according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Turning now to the drawings, FIG. 1 illustrates an example data collection and analysis system 10 for facilitating real-time access to data collected from multiple mobile devices. The system 10 allows the organization to obtain real-time reports of aggregated collected data or performance data from multiple mobile sources. Data available in real-time may include but not be limited to data collected via mobile device applications, mobile user performance metrics, and mobile device performance metrics.

The data collection and analysis system 10 includes a Shared File Systems Explorer Client ("Explorer Client") 12, a Shared Mobile File Systems Gateway ("Gateway") 14, and a Mobile File System Mounting Client ("Mounting Client") 16. The Explorer Client 12 and the Mounting Client 16 are adapted to function on a plurality of user devices 18a-g which are, in some aspects, mobile devices. As illustrated, the Explorer Client 12 may be provided on devices including, but not limited to, a tablet PC 18a, a laptop computer 18b, a cellular telephone 18c, a cradled personal digital assistant (PDA) 18d, a wireless PDA 18e, a smart phone 18f, a desktop computer 18g, or an Ultra mobile PC (not shown).

It is to be understood that the mobile devices 18a-f are examples and the data collection system 10 could support many identical, or different, mobile devices such as for example the PDA 18e distributed to numerous mobile users to collect data. The mobile devices 18a-f generally include at least one processor, a communication interface(s), input device(s) such as keypads or touch screens, and the like, and a display to facilitate user interaction with the device. The Mounting Client 16 may be provided to additional devices, such as, for example, a database 19a, web services 19b, a desktop computer 19c, an application server 19d, enterprise applications 19e, or file systems 19f. The Gateway 14 may be provided on a mainframe (operating on a UNIX platform), a PC server, or a similar device. The Mounting Client 16 is also provided on a web portal server 20 which manages a web portal 22. Among the functions supported by the web portal 22, in this example, is the ability of the user to view and analyze data collected via mobile-form applications on the mobile devices 18a-f in real-time by accessing the portal 22 through any browser enabled device such as the desktop computer 18g. The web portal server 20 is coupled via a network to the additional devices such as the database 19a and the server 19d.

The Explorer Client 12 provides an interface from a wide variety of mobile devices 18a-f (using the native file explorer interface of the particular mobile device) for accessing and managing content across distributed, intermittently connected file systems 19f and other devices running the Mounting Client 16. The Gateway 14 allows users to create a centrally managed, fully distributed peer-to-peer file sharing and distribution network. Operators make a file system's 19f content available for sharing by registering it using the Mounting Client 16. The Explorer Client 12 allows users to securely and efficiently move and copy objects between registered file systems. In addition, a number of advanced content management capabilities are provided by the Gateway 14 including an ability to inform a user when a piece of content has changed or become available. At the same time, administrators may track and report content usage including the specific association of content with users. Both the Mounting Client 16 and the Explorer Client 12 can communicate through firewalls to the Gateway 14.

The Explorer Client 12 is a native application that runs on the mobile devices 18a-f. The Explorer Client 12 contains components written in several different programming languages including C, C++, C#, .NET and Java. The Explorer Client 12 is adapted to run on a variety of different devices including devices running the Microsoft Windows Mobile OS (formerly Pocket PC or PPC), the Symbian OS, the Windows 2000 OS (Win2K, Windows Millenium), the Windows XP OS, the Windows XP tablet OS, the RIM OS, and the Palm OS.

According to one example, the Explorer Client 12 runs in the native file system of the mobile devices 18a-f. Thus, a user is able to utilize the Explorer Client 12 without any additional training. Further, the Explorer Client 12 supports the full capabilities of the native file system on the mobile devices 18a-f. This provides a "highest common denominator approach" to content management.

According to another example, implementation of the Explorer Client 12 provides a "thin client" that runs in a browser. This provides "lowest common denominator" coverage especially for those devices whose file system capabilities are limited (e.g., RIM). It also enables users to access content when they are not requesting the content from their own mobile devices 18a-f.

The Explorer Client 12 includes a communication stack module which allows for communication between the Explorer Client 12 and the Gateway 14. According to one example, the communication stack module allows the Explorer Client 12 to communicate with the Gateway 14 in the Hypertext Transfer Protocol over Secure Socket Layer (HTTP over SSL) and the Transport Layer Security (TLS) protocols. SSL is an open, nonproprietary protocol that uses a 40-bit key size for the RC4 stream encryption algorithm, which is considered an adequate degree of encryption for commercial exchange. Further, HTTP over SSL supports the use of X.509 digital certificates from the server so that, if necessary, a user can authenticate the sender. Other encryption techniques such as the Advanced Encryption standard (AES) can be utilized. For example, an s-mime technique could also be adopted where the target application is e-mail. Furthermore, the forms designer can specify that the data captured as an XML document on the mobile device may be encrypted using a public or secret-key cryptosystem (e.g., Kerberos, PKI, etc.) to properly secure the content on the mobile device if the device was stolen or lost, or if any of the devices 19a-f or the portal server 20 was compromised.

According to one embodiment, the communication protocol of the system 10 utilizes HTTP(S) as the preferred protocol to transport all data files. The system 10 may utilize, as the preferred protocol to distribute and notify other internal or external resources (e.g., users, other machines, etc.), HTTP/HTTPS, SyncML, ActiveSync, SOAP, SMTP, FTP, SMS, SNMP, SMPP, RMI, IIOP, etc. Other communication protocols can be utilized without nullifying the key attributes of the above-described implementation. For example, web extensions such as SOAP and .NET can also be utilized, as well as proprietary communication protocols. A policy-based mobile content engine may also act as an authorizing proxy for each of these protocols that allows the mobile-form applications to communicate in real-time with one or more enterprise content sources 19e hosted behind the enterprise firewall. For example, a drop down list in a mobile-form application could be dynamically generated by a SOAP request to an enterprise content source 19e. The mobile content engine would apply appropriate policies both before and after routing the SOAP request from the mobile-form application onto the enterprise content source 19e.

The Explorer Client 12 also includes encryption libraries which are native device libraries that support encryption. According to one example, the mechanism for encrypting is SSL and the libraries are native SSL and TLS libraries. The Explorer Client 12 further includes a Client User Interface (CUI). The CUI provides a mechanism for presenting to the user a view of one or more file systems 19f and for manipulating the contents of those files systems 19f. According to one example, the mechanism for implementing the CUI is to utilize an existing native file explorer application, on the mobile devices 18a-f, that has been suitably extended. It is generally known within the industry that the native file explorers support such extensions.

The Explorer Client 12 also contains an authentication and authorization module. This authentication and authorization module enables a user of a device 18a-g to be authenticated and authorized against the Gateway 14, and includes communication and user interface components. The Explorer Client 12 may enable existing authentication such as LDAP and RADIUS servers (local or remote, outside or behind the firewall with support for "single sign on" schemas) among others, to be used by the Gateway 14 to authenticate users of the devices 18a-g or other devices 19a-f. Authorization providers are used to determine it the client is authorized based on their access permissions determined, but not limited to, the client's role and/or group access permission on the accessed resource (e.g., updating or creating a forms data instance).

Finally, the Explorer Client 12 contains a mechanism for view management that allows the Explorer Client 12 to present a view of the content available to the user (based on their permissions and other restrictions enforced by the Gateway 14) across one or more of the remote file systems. According to one embodiment, the implementation of this mechanism maintains a folder hierarchy view of virtual directories (network folders).

The Gateway 14 provides a centralized network access point between the Explorer Client 12 and the remote, distributed, intermittently connected file systems 19f. The Gateway 14 preserves the native security of the remote file systems 19f while enabling additional layers of security and administration specific to the system 10.

In this example, the Gateway 14 is a primarily java application that runs within an existing web application server. The Gateway 14 can run on a number of different application servers including BEA Weblogic, and IBM Websphere and on a number of different operating systems including, but not limited to, Windows NT, Windows Server, Solaris, Linux, and HPUx.

The Gateway 14 is able to provide security across multiple network domains. It can secure content and authorize users wherever the content or users are regardless of whether they are inside or outside a corporate firewall. For example, in a Management Service Provider (MSP) or an Application Service Provider (ASP) environment, the Gateway 14 can flexibly control security and access between and across different corporate domains each with a different authentication and authorization models. The Gateway 14 includes support for Kerberos, VPNs, etc.

The Mounting Client 16 provides an interface from a wide variety of devices such as the devices 19a-f and the portal server 20 to publish or enable access to the local file system 19f via the Gateway 14. The Mounting Client 16 has the exact same components and modules as the Explorer Client 12, except that instead of a CUI the Mounting Client 16 has a File Mounting User Interface (FMUI) and includes additional components, such as a delta scan and security components. Utilizing the FMUI, a user can navigate and select portions of their local file system 19f, and then navigate and indicate where in the Gateway 14 network folders the content should be made available on the Gateway 14. At this time, the Explorer Client 12 and Gateway 14 assimilate the containment structure and establish references to each of the folders and file objects therein. In this manner, the content on the newly mounted remote file system 19f is incorporated into the virtual abstraction layer maintained by the Gateway 14 and viewed through an Explorer Client 12.

In addition to the file system mapping/mounting capability, the Mounting Client 16 allows users to "copy" or "move" digital content into file systems 19f that are local to the Gateway 14. This capability is useful in situations where the user does not care that the remotely accessible content is not tied to the original content in the file system 19f.

The portal 22 supports a website which allows a user, according to access granted via the Explorer Client 12 and the Mounting Client 16, accessibility to files stored on the remote file system 19f and potential access to other devices running the Mounting Client 16. The portal 22 provides an interface which allows a properly authenticated and authorized user to perform different functions via connection of a web-browser enabled device such as the devices 18a-18g. In this example the portal server 20 has access to the database 19a and applications which are run on the server 19d in order to provide a user of the portal 22 the ability to view data collected by the mobile devices 18a-f in real-time, as will be explained below.

The portal server 20 includes an HTTP server component which serves as a central access point for end-users such as the users of the devices 18a-g. The end-users may also interact directly with a client stub, which communicates with the HTTP server component. The HTTP server component is in communication with style sheet components and a view controller component to ensure proper formatting of content to users who request the portal 22. The view controller is in communication with the application server 19d, which serves as a central server for handling requests from the portal 22 for functions such as the customization of mobile-form applications.

In this example, the application server 19d provides an Enterprise JavaBeans (EJB) container at the business logic layer and performs load balancing and clustering operations to enable efficient workflows in the system 10. The application server 19d may be the device through which other components and modules as will be described below are implemented. It is preferred to use a host for the application server 19d that is capable of handling thousands of concurrent processes, thousands of open sockets, and several megabytes of data. The application server host must have enough processing power to handle multiple concurrent tasks, and multiple CPU systems are preferred as application server hosts according to one example of the application server 19d. The application server 19d also needs sufficient random access memory (RAM) to process a large amount of media and textual data per transaction, as well as to meet caching database requirements. The application server host has sufficient disk space to store an operating system and required software to perform patches and updates, cache information from databases such as the database 19a when the information is not in RAM, and to store server logs and error reports.

It is preferred for the system 10 to be agnostic to application servers, such that a variety of different types of servers may be used as application servers. This server agnosticism contributes to the ability of the system 10 to utilize a distributed architecture and to facilitate redundancy, scalability, and clustering in different types of deployments of the system 10.

The system 10 in FIG. 1 provides superior end user, network, and client performance in several different ways. First, data compression may be used both in downloading newly dispatched and uploading updated form data instances. Furthermore, the application server 19d determines when file attachments associated with the mobile-form application data instance should be delivered to the mobile devices 18a-f using both the type of network and attachment size. Additionally, the system 10 supports external model updates (e.g., customer list, price list, inventory list, etc.). These types of lists typically consist of a large amount of data that should only be updated at given times or when network availability permits. For more time critical updates to the list, byte level differencing and data compression can be used to update the end-users list with the changes rather than the updated list. This may reduce the network data consumption by over 80% depending on the changes made to the list. Byte level differencing is done by transmitting only the changes between the old list and the new list (byte level differences) and by applying those changes as an update to the old list on the mobile devices 18a-f to create the new list on the mobile device. It can also be used to update an attachment to a form data instance.

The system 10 provides superior availability to mobile workers by enabling offline form filling when confined to areas with restricted network connectivity and by enabling online, near real-time, updates of form data to the server. Further, the system 10 helps to ensure that mobile-form applications and associated resources (e.g., external lists), are pushed as mandatory items. The system 10 controls delivery of captured data records or instances and mobile-form applications to the mobile devices based on, but not limited to, network connectivity, time, etc. Near real-time or scheduled updates to a mobile-form application file is enabled by, for example, using byte level differencing and data compression to reduce the size of the markup transported to the mobile device. The system 10 further enables automatic calculations, comparisons, enforced fields, data input limitations, mandatory fields, contextual form behavior, read-only and pre-filling of form data, thus assisting in speeding up data capture and business process completion.

As explained above, the Explorer Client 12 provides access and communication through the Gateway 14 with the components such as the server 19d of the system 10 in FIG. 1. The Explorer Client 12 and server 19d in this example provide all APIs and retrieve all files and applications required to support functions such as data collection via the mobile-form applications on the mobile devices 18a-f. The mobile devices 18a-f have a form rendering application which takes mobile-form applications and renders the form to the end user on the display screen of a mobile device such as the mobile device 18e in FIG. 1. This allows the user to perform functions such as, but not limited to, collecting data using such mobile-form applications on the mobile device 18e. The form rendering application includes rendering engines using the XML-based forms application definition markup language to render a rich set of GUI form controls and to process the corresponding behavior of the mobile-form application for the end-user. The rendering engines are adapted to create a fully configurable look and/or feel for the end-user. Furthermore, the form rendering application is capable of displaying (read-only or read/write), updating, and capturing the end-user's inputted data on- or off-line as one or more XML documents, as well as attachment files and managed lists that may be in a format other than XML.

The form rendering application is also able to display, update, capture and attach a wide variety of multi-media content to the form data available to the mobile devices. Alternatively or additionally, the rendering engines in the form rendering application are adapted to encode this data to the XML form data instance as a base64 encoded element or reference the inputted text or binary file as a separate entity. The form data may include, for example, signatures, photos, voice notes, sketches, global positioning information, GoogleMaps, bar code scanning information, automobile monitoring information, etc.

The content used by the form rendering application may either be embedded within the XML form data (base64 encoded) or be referenced and managed as attachment files in a very elegant way as content under the control of policies that control how the content is managed and distributed (e.g., not forcing sending large multimedia files associated with the form when the form is submitted wirelessly— unlike other database/sync or real-time forms solutions). The form rendering application may support a wide variety of technologies and input devices (e.g., Personal Digital Assistants (PDAs), smartphones, etc.) for data capture and form navigation. The input devices are linked to and interact with controls defined in the mobile extensible forms markup language to provide and enable data capture and form navigation.

By way of example, the form rendering application, via the defined controls, are adapted to support a plurality of input devices, such as: keyboards (e.g., PC keyboard, keypad, Simple Input Panel (SIP), soft-keyboard, touch screen display inputs, etc.); navigation, mouse, and I/O devices (e.g., optical mouse, RS-232 standard modules, touch-screens, scroll wheels, USB memory dongles, hard-drives, etc.); writing instruments and pointers (e.g., stylus, electronic pen/ink, handwriting to text conversion apps, etc.); audio (e.g., speech to text recognition, speech used for the selection of an item from a list, speech used for form navigation using technology such as VRML, voice recorders, etc.); infrared reader; magnetic reader and cards (e.g., swipe card, proximity card, smart card, expandable media cards and storage devices such as, for example, SD, MMC, compact flash, memory stick, etc.); Radio Frequency Identification (RFID); external or internal device peripheral (e.g., GPS, environmental meter, printers, etc.) including devices or data monitoring and reporting modules within an automobile (e.g., telematics); external or internal applications (e.g., VoIP softphone software, GPS software, etc.); scanners (e.g., optical character reader (OCR), bar code, biometric, etc.); incoming messages (e.g., via SMS, Smart Messages, OMA, SyncML, Email, SNMP, Active Sync, SMPP, SMTP, RSS/XML, etc.); and camera and digital imaging tools and devices.

The mobile-form applications used by the mobile devices 18a-f, according to one example, are specified in XML-based forms application definition markup language based on the W3C XForms specification to define a rich presentation of forms rendered in a Graphical User Interface (GUI) by the mobile forms application thick or thin-Client. Some enhancements have been made to extend the XForms schema to make it more efficient for mobile-form applications, as well as to support layout of form controls on mobile devices, and integrating routing of forms between users in a mobile-form application. An XML-based policy model is utilized by the mobile-form applications to define application and form states, workflow, validations, conditions, and actions to be processed for the life cycle of a new or updated form data instance. The policy model defines how the form data is managed (e.g., transformation and validation of data, publication of data to targeted resources, publication of data based on the type network connection, notifications and alerts to users based on form actions and events, etc.) and distributed, as well as to whom (people, systems, resources, etc.) it is distributed.

As discussed above, the mobile extensible forms markup language (mXForms) used in the mobile-form applications is based on the XForms W3C recommendation. The mXForms markup language defines how to render rich GUIs on-line or off-line for mobile devices, and display, update and captures data. mXForms and XForms distinctly define the presentation definition (look and feel), the format of the data captured, form controls, and the behavior of the forms-based application (e.g., data validation, navigation, workflow, actions, etc.). The mXForms language can fully leverage the limited display and functionality (including native and external peripherals—e.g., barcode scanner, GPS module, etc.) of some of the targeted mobile devices. Multiple views or mobile forms applications may be required to complete the data capture of a forms-based application, including support for contextual (e.g., dynamic) views or interaction with the form (e.g., Y happens only if the user has selected X in the form). Unique form controls are also needed to display, add, edit, and delete repeating line items on such limited devices. The markup language also affords for creation of unique form controls that future business processes may require. These multiple views and form controls can be used on- or off-line, via thin/thick clients on mobile devices that are OS-enabled.

Figure 2A:
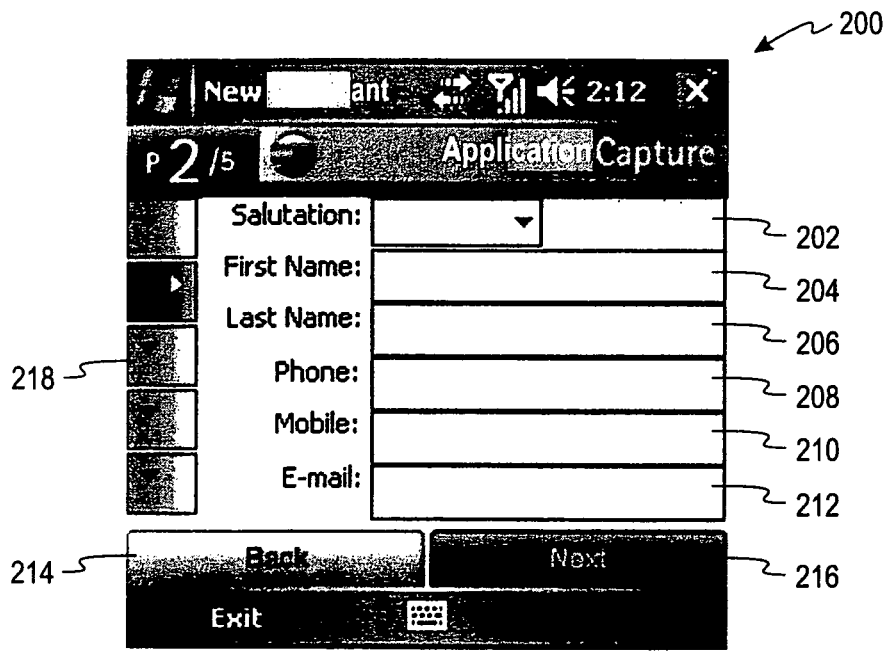
FIGS. 2A-2B are illustrations of screen displays of a data collection interface generated by a mobile data collection application operating on a mobile device in FIG. 1.
Figure 2B:
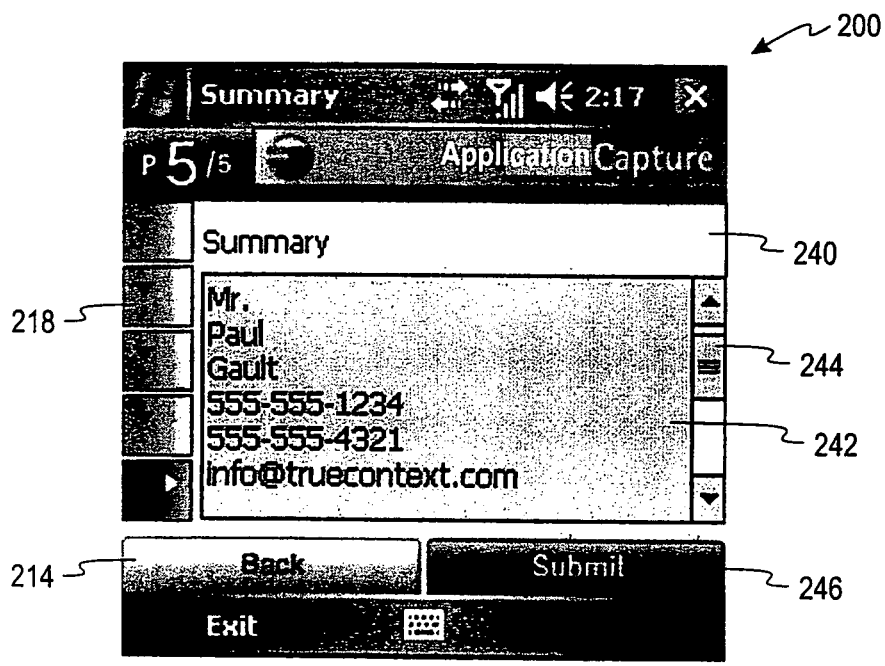

For example, a mobile workforce can be running mobile-form applications, such as one designed to collect data relating to credit card applications, on multiple mobile devices such as the mobile devices 18a-f shown in FIG. 1. FIGS. 2A-2B are screen shots of a display 200 of a mobile device such as the mobile device 18e in FIG. 1 which are rendered by the form rendering application in operating the credit card application collection mobile-form application. FIG. 2A shows a data entry screen 202 for credit card application collection mobile-form application. The data entry screen 202 includes a "first name" field 204, a "last name" field 206, a "phone" field 208, a "mobile" field 210 and an "e-mail" field 212 for capturing data relevant to credit card applications. The user can navigate to different input screens using a back button 214 and a next button 216. Alternatively, a navigation bar 218 may be used to select different data input screens.

After all the data fields are completed in the data entry screens such as the data entry screen 200, the collected data may be summarized by the mobile-form application before submission to a remote data server such as the server 19d in this example. FIG. 2B is a screen shot of a summary screen 240 appearing on the display 200. The summary screen 240 includes a text box 242 which shows the collected data from the fields in the input screens such as the input screen 202. A scroll control 244 allows a user to view other text in the text box 242. The summary screen 240 includes a submit application button 246 which allows a user to submit the collected data in the form of a data record to a remote client such as the database 19a or a server 19d via the communications interface of the mobile device. The collected data is made available for display in real-time (i.e., contemporaneously with the time the collected data is submitted) via the portal 22.

The portal server 20 provides a web based interface (i.e., a webpage) to display data collected by the mobile devices. Analysis of the data may also be displayed in real-time based on quantitative analysis applications which may be run on the server 19d or any other client receiving the collected data when submitted by the mobile-form applications. The data analysis may be performed by any device in the system 10 including but not limited to a web based application on the portal server 20. The portal server 20 continuously updates the portal webpage to reflect the new data.

Figure 3:
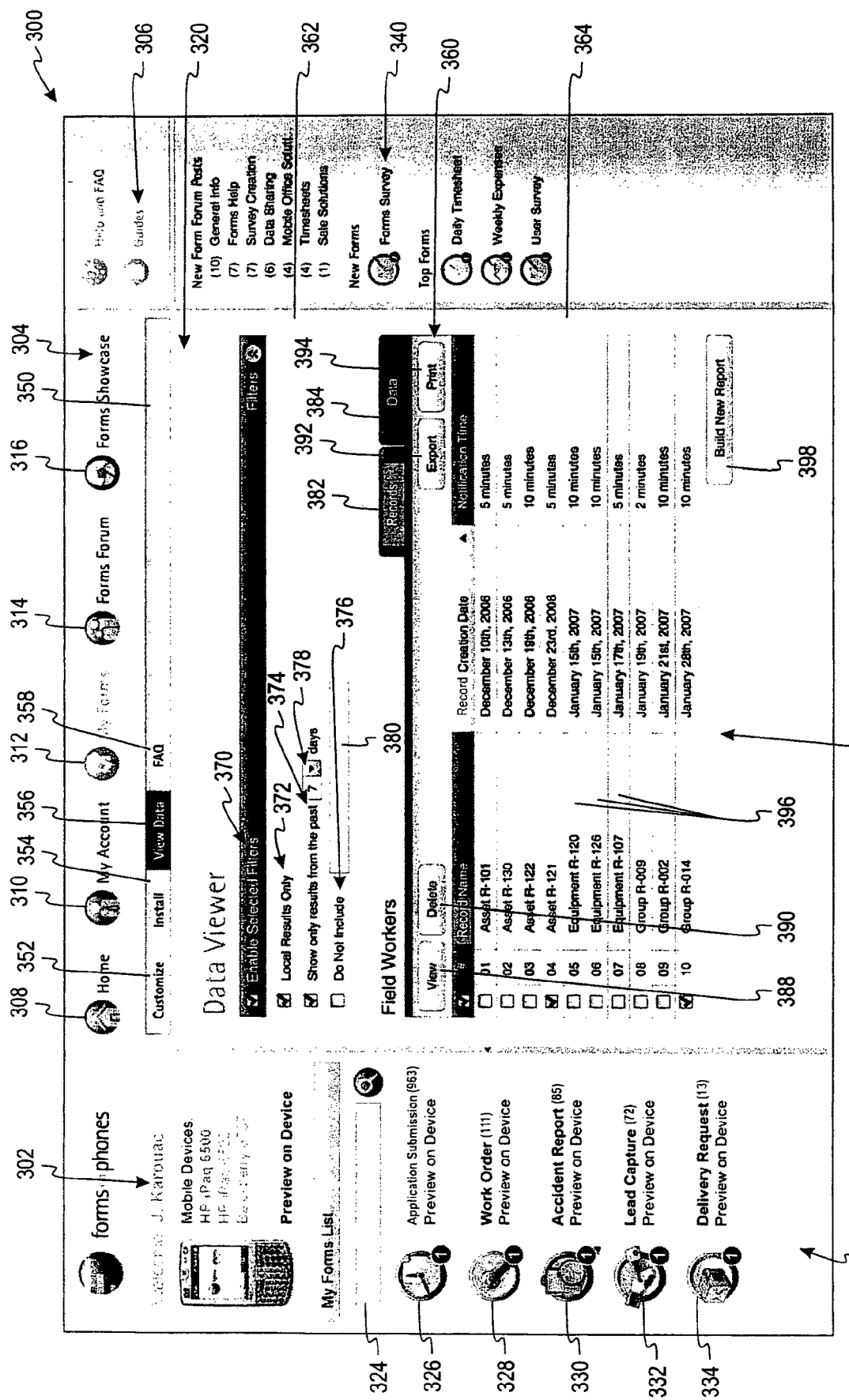
FIG. 3 is an illustration of a screen display of an interface presented to a user to obtain real-time data collected by the mobile device in FIG. 1.

The portal server 20 provides portal functionality to the user via any browser enabled device such as the personal computer 18*g* in FIG. 1. In this example, the portal 22 is available to a user and makes visible in real-time the data collected via the mobile devices 18*a*-f and/or any previous data stored on the database 19*a* managed by the application server 19*d*. The portal 22 also may provide the display of user or mobile device performance metrics data. An example of a web-based portal interface 300 is shown as a webpage in FIG. 3. The web-based interface 300 is displayed via a web-browser on a browser enabled device such as the devices 18*a*-g in FIG. 1 accessing the portal 22. The web-based interface 300 includes residual controls for different functions available from the portal 22 such as a user identification and log in area 302, a links area 304 and an information area 306. The links area 304 contains links to navigate other webpages supported by the portal 22 which may include a personalized "home page" link 308, an "account" link 310, a "my forms" link 312, a "forms forum" link 314 and a "forms showcase" link 316. The "home page" link 308 allows the display of a personal introduction webpage which includes personal functions to the user such as viewing messages (an example of a personalized introduction webpage may be seen in FIG. 4B). The "account" link 310 allows the display of an administrative webpage which includes data relating to the user account and controls from editing such data. The "forms forum" link 314 displays a webpage including comments and messages posted by other users regarding the mobile-form applications. The "forms showcase" link 316 allows the display of a webpage containing a catalog and description of available mobile-form applications.

In this example, the user has selected the "my forms" link 312 resulting in the display of a forms details area 320. A forms list area 322 includes a display of available mobile-form applications to the user and is a default area on any webpage accessed through the portal 22. In the forms list area 322, the user may search for mobile-form applications via name or part of a name using a search box 324. In this example, the available mobile-form applications are accessible via the function of the application represented by an application submission icon 326, a work order icon 328, an accident report icon 330, a lead capture icon 332 and a delivery request icon 334. The icons 326-334 display the number of mobile-form applications available to the user in each category as well as the number of times the form application has been used in parentheses after the name of the mobile-form application. Selecting an icon such as the lead generation icon 334 will result in real-time display of data collected via the mobile-form application represented by the icon being displayed. A forum area 340 is also available to provide a user access to postings from other users regarding forms.

The forms details area 320 in this example includes a menu area 350 that includes a "personalize" or customize selection 352, an "install" selection 354, a "view data" selection 356 and an information ("FAQ") selection 358. The "personalize" selection 352 opens a window that is an interface to customize a mobile-form application. The "install" selection 354 opens a window to give the user options to install a mobile-form application to specific mobile devices and to make available a mobile-form application to users of the mobile devices such as the mobile devices 18*a*-f in FIG. 1. The information selection 358 opens a window for the user to obtain help information The "view data" selection 356 has been selected in FIG. 3 and opens a data viewing area 360 to show data records submitted by a selected mobile-form application running on one or more mobile devices. In this example, the mobile-form application is the credit card application data collection application shown in FIGS. 2A-2B above. The data viewing area 360 is displayed on the web-based interface 300 when an icon in the forms list area 322 or the view data selection 356 in the menu choice area 350 is activated. The data viewing area 360 includes a filtering control area 362 and a data summary area 364. The filtering control area 362 includes various filters which may be applied to data collected by the selected mobile-form application. The filtering control area 362 includes an enable selected filters option 370 which may be activated by a check box control. The enable selected filters option 370 allows a user to select and apply multiple filters on the collected data records from the mobile devices. A variety of filter options are also displayed. In this example, the filter options include a local results filter option 372, a time limit filter option 374 and an exclude filter option 376. The various filter options 372-376 may be enabled by selected a check box control. Certain options allow a user to select additional limitations on the filter. For example the time limit filter option 374 includes a numerical selection menu 378 allowing a user to select the number of past days of data records to be displayed. The exclude filter option 376 includes a text box 380 for a user to enter the name or names of data records to be excluded. Of course other filter options may be displayed to allow a user to filter data results.

The data summary area 364 has a records tab 382 and a data tab 384. The specific raw data included or associated with each data record may be viewed by selecting the data tab 384. The records tab 382 has been selected in FIG. 3 and results in a records table 386 showing information relating to data records submitted by mobile devices running the mobile-form application. The data records include the most recent data from the mobile-form applications on the mobile devices. The records table 386 includes a view button 388, a delete button 390, an export button 392, a print button 394 and a build new record button 398 which allow a user to manage the data records. The records table 386 displays rows of data records 396 based on the name of the data record, the creation date and the notification time of each data record created. The notification time is an example of a specific business process which may be set up to be associated with a data record. In this example, the notification time is an internal organizational reminder of how long the data record should be processed. A particular data record may be selected via check box by the name of the data record.

Selecting the view button 388 opens a window to view the selected data record. The delete button 390 when selected deletes the selected data record or records. Selecting the export button 392 allows a user to export the data record to another application such as Excel. Selecting the print button 394 allows a user to print the selected data record. Selecting the build new record button 398 displays an interface to create a new data record from the interface.

Figure 4A:
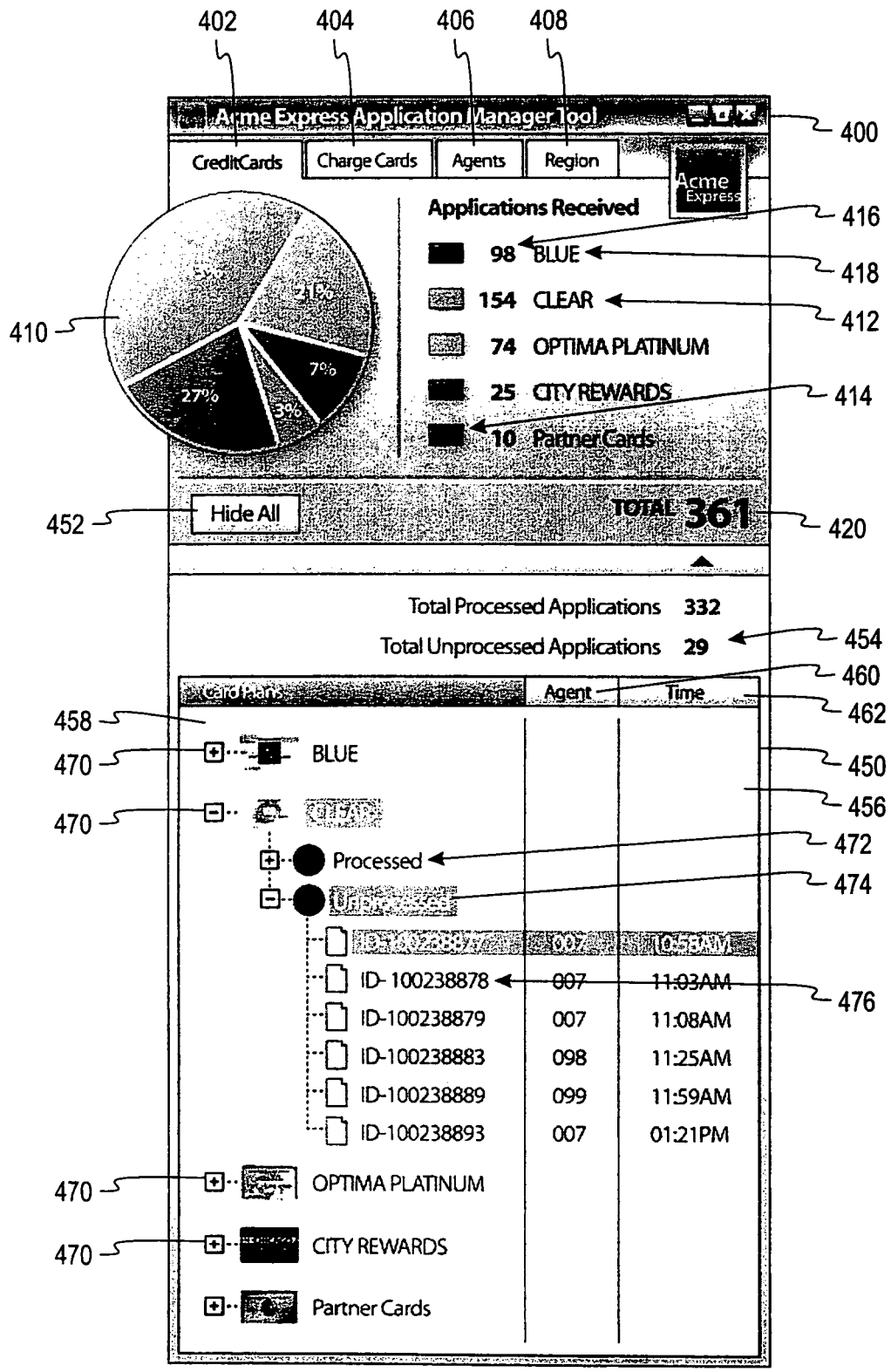
FIG. 4A is an illustration of a screen display of a dashboard type interface presented to a user to obtain real-time data collected by the mobile device in FIG. 1.

FIG. 4A illustrates a screen shot of a main "dashboard" type interface 400 which may be accessed via a menu which could be activated via the records tab 382. The interface 400 in this example shows data on the number of credit card applications submitted from the users of mobile devices using the mobile-form application described above in FIGS.

2A-2B. The interface 400 has a series of display access tabs 402, 404, 406 and 408 which allow different data summary screens to be displayed. In this example, the credit card tab 402 is selected which displays data collected in real-time for credit card applications submitted by the mobile-form applications on the mobile devices 18a-f in FIG. 1. A similar statistical display relating to charge card applications submitted by the mobile devices may be shown by selecting the charge cards tab 404. Other real-time data on user or mobile device performance metrics may be displayed by selecting the agents tab 406 or the region tab 408. The types of data displayed and the format of the data on the dashboard interface 400 may be designated by the mobile-form application, selected by a user, or customized in some other manner.

In this example, the dashboard interface 400 displays a pie chart graphic 410 with a coding area 412 which includes a coding scale 414 corresponding to the different parts of the pie chart graphic 410. Other types of graphics, such as a bar graph, may be used instead of the pie chart graphic 410. The coding scale 414 in this example uses colors to assist a user in the representation of credit card applications (data records) for each credit card brand. Of course, other indicators such as different patterns, shading, shapes, etc. may be used on the coding scale 414 and the pie chart graphic 410. In this example, the coding scale 414 and the pie chart graphic 410 represent the total number of credit card application data records submitted by the mobile devices 18a-f. The numbers of credit card applications for different credit card brands are reflected as percentages of the total number of credit card applications and are indicated numerically and graphically as the sections of the pie chart graphic 410. The coding scale 414 also includes a numbers of applications received column 416 and a name column 418 under which the numbers of each data record submitted for different credit card brands appear. In this example, there have been applications submitted for five different credit card brands. A total number field 420 shows the total number of credit card application data records submitted by the mobile devices 18a-f. The pie chart graphic 410 and the coding scale 414 are continuously updated and redrawn in real-time as new data records are submitted and aggregated with the previously collected data records.

A user may choose to examine specific data by activating a data summary area 450 which includes real-time statistics regarding data collected from the mobile devices 18a-f in FIG. 1. The data summary area 450 may be hidden by selecting a "hide all" button 452 and may be displayed by selecting a "show data" button (not shown). The portal server 20 provides portal functionality to the user which then can provide the interface 400 to aggregate the data and provide pre-determined statistical views as explained above. This view of the data is based on the pre-built data model that is the basis for a data analysis application run by the server 19d. The statistical view of the data capture can also reflect the customization options invoked by the user of the portal 22. Because the application server 10d tracks numerous data points such as users and mobile device application usage, detailed drill down into the data records are possible, as shown by the data summary area 450.

The data summary area 450 includes a totals area 454 and a data records table 456. In this example, the totals area 454 breaks down the total number of credit card applications by desired business policies such as the credit card brand of the applications received and whether the applications have been processed or not processed. The business policies may be tracked in real-time according to back-office systems such as credit card application processing software running on an enterprise system.

The data records table 456 includes a file system graphic 458, an agent column 460 and a time column 462. The file system graphic 458 organizes each application by folders 470 representing type of the credit card in this example. Each folder 470 contains a processed folder 472 and an unprocessed folder 474. The folders 470, 472 and 474 may be expanded to show all the items in the expanded folder. For example, the unprocessed folder 474 has been expanded to show individual credit card applications 476 by identification numbers assigned by the system 10. Each of the individual credit card applications 476 include the identification number of the agent or mobile device user who submitted the credit card application under the agent column 460 and the time when the application was submitted by the mobile device under the time column 462. The file system graphic 458 is updated when new data is received by the server 19d in FIG. 1 to reflect the additional new data. By selecting the individual credit card application, a user may display all of the data collected regarding the individual credit card application data record.

Figure 4B:
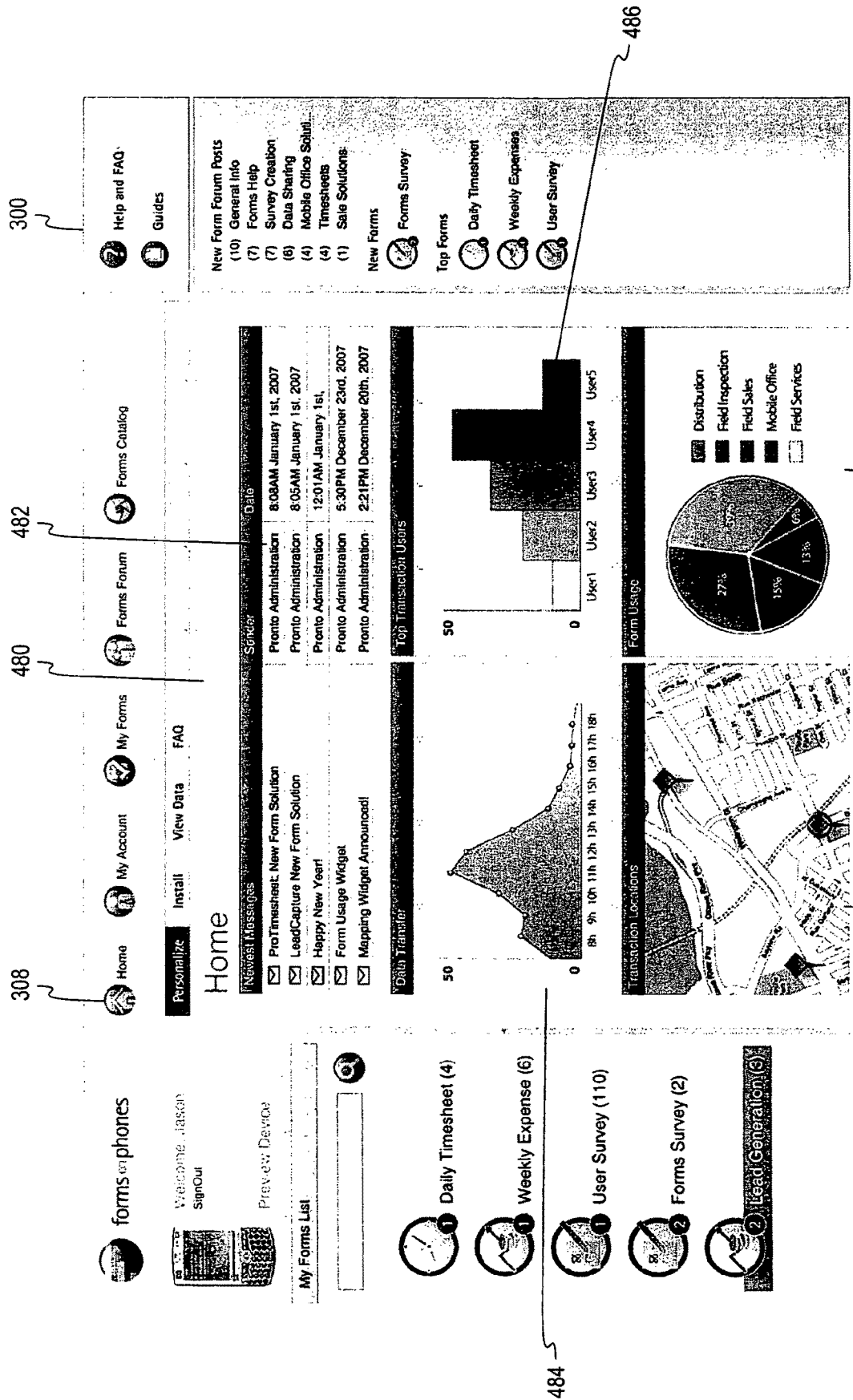
FIG. 4B is an illustration of a screen display of the dashboard type interface in FIG. 4A interposed on a portal web homepage.

The dashboard type display interface 400 in FIG. 4A may be used in conjunction with other interfaces. For example, a portal user may configure their homepage to include real-time updates of data via an interface such as the dashboard type interface 400 in FIG. 4A. FIG. 4B shows an example of the use of a dashboard display in conjunction with the portal homepage 300 in FIG. 3. In this example, the user has selected the home link 308 to display a home information area 480. The home information area 480 is generally user configurable and includes a message area 482 to allow the user to retrieve messages such as e-mail. The home information area 480 also includes different dashboard displays 484, 486, 488 and 490 which display different real-time data. In this example, the data shown by the dashboard displays 484, 486, 488 and 490 relates to the performance metrics of the mobile devices and the mobile device users collecting and submitting data records. Each of the displays 484-490 are updated in real-time as data records such as collected data and performance metrics of mobile devices and users are submitted to the server 19d. The specific real-time data displayed may be selected by the user or default options may be used.

For example, the dashboard display 484 shows a graph of data transfer over a certain time period from the mobile devices. The graph is segmented by number of data records received per hour, although other time increments may be used. The dashboard display 486 shows a bar graph broken down by transactions performed by different mobile device users. The dashboard display 488 shows the location of each of the mobile devices relative to a displayed map. In such a case, the mobile devices include a location sensor, such a GPS system, and location coordinate data is submitted periodically to the server 19d. The dashboard display 490 shows a pie chart of the use of each of the different mobile applications which may be available to the mobile devices. Of course, many other types of displays and data may be used.

Figure 5:
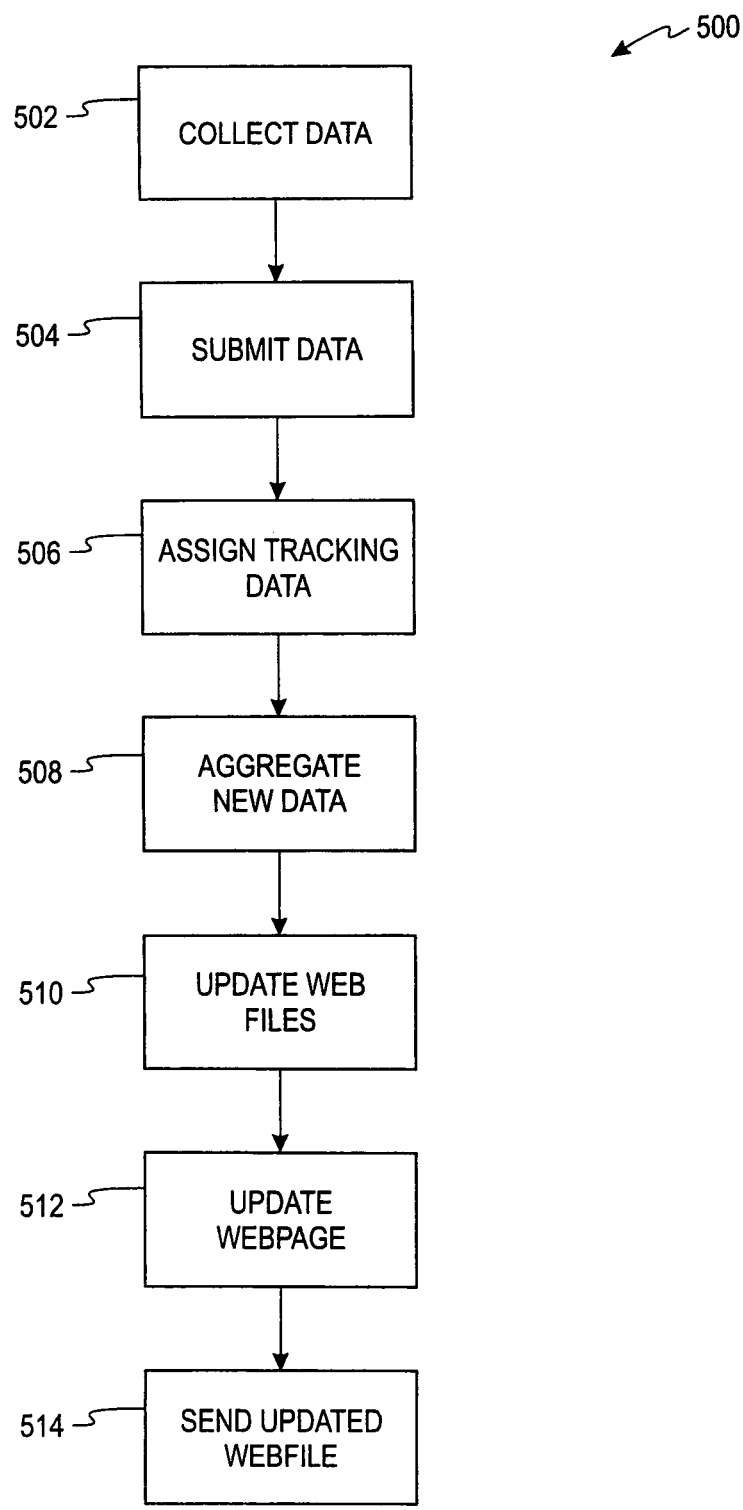
FIG. 5 is an illustration of a flowchart of a process to display data collected by mobile devices in real-time, according to one embodiment of the present invention.

Referring now to FIG. 5 which illustrates a flow diagram 500 of the process used by the system 10 in FIG. 1 to provide real-time data records from the mobile devices 18a-f. The flow diagram 500 is representative of example machine readable instructions for implementing the system 10 of FIG. 1. In this example, the machine readable instructions comprise an algorithm for execution by: (a) a processor, (b)

a controller, and/or (c) any other suitable processing device. The algorithm may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it maybe implemented by an application specific integrated circuit (ASIC), a programmable logic device (PLD), a field programmable logic device (FPLD), discrete logic, etc.). For example, any or all of the real-time data applications could be implemented by software, hardware, and/or firmware. Also, some or all of the machine readable instructions represented by the flowchart of FIG. 5 may be implemented manually. Further, although the example algorithm is described with reference to the flowchart illustrated in FIG. 5, persons of ordinary skill in the art will readily appreciate that many other methods of implementing the example machine readable instructions may alternatively be used. For example, the order of execution of the blocks may be changed, and/or some of the blocks described may be changed, eliminated, or combined.

In step 502, data is collected via the mobile device such as the mobile devices 18*a-f* in FIG. 1. In this example, the data is collected by the user using the interface of the mobile-form application which is run on the mobile device such as the mobile device 18*e* described above in the example shown in FIGS. 2A-2B. The completed data record (i.e., completed credit card application) is then submitted to the central server such as the server 19*d* when the collection of the completed data record is completed in step 504. The data record may also include mobile device generated performance metrics data or user specific data.

Upon receipt of the dataset from the mobile device, the server 19*d* attaches tracking data to the received dataset and the identity information relating to the mobile device which submitted the dataset in step 506. It is to be understood that step 506 may be performed either wholly or partially by the mobile device by direction of the mobile-form application during the submission process. The server 19*d* or web applications on the portal server 20 then run the data analysis programs which aggregate the received data to the previously compiled data related to the mobile application in step 508. The newly aggregated data is then made available to the portal server 20 in FIG. 1. The portal server 20 runs an API which updates the data in the files such as style sheets supporting the website graphics according to the newly received and analyzed data records in step 510. The instant update allows a browser request made by a browser-enabled device such as the devices 18*a-g* to receive the data in real-time. The webpage indicating the newly updated aggregated data is then updated in step 512 by the web portal server 22. The new webpage is then sent to the browser-enabled device in step 514.

Figure 6:
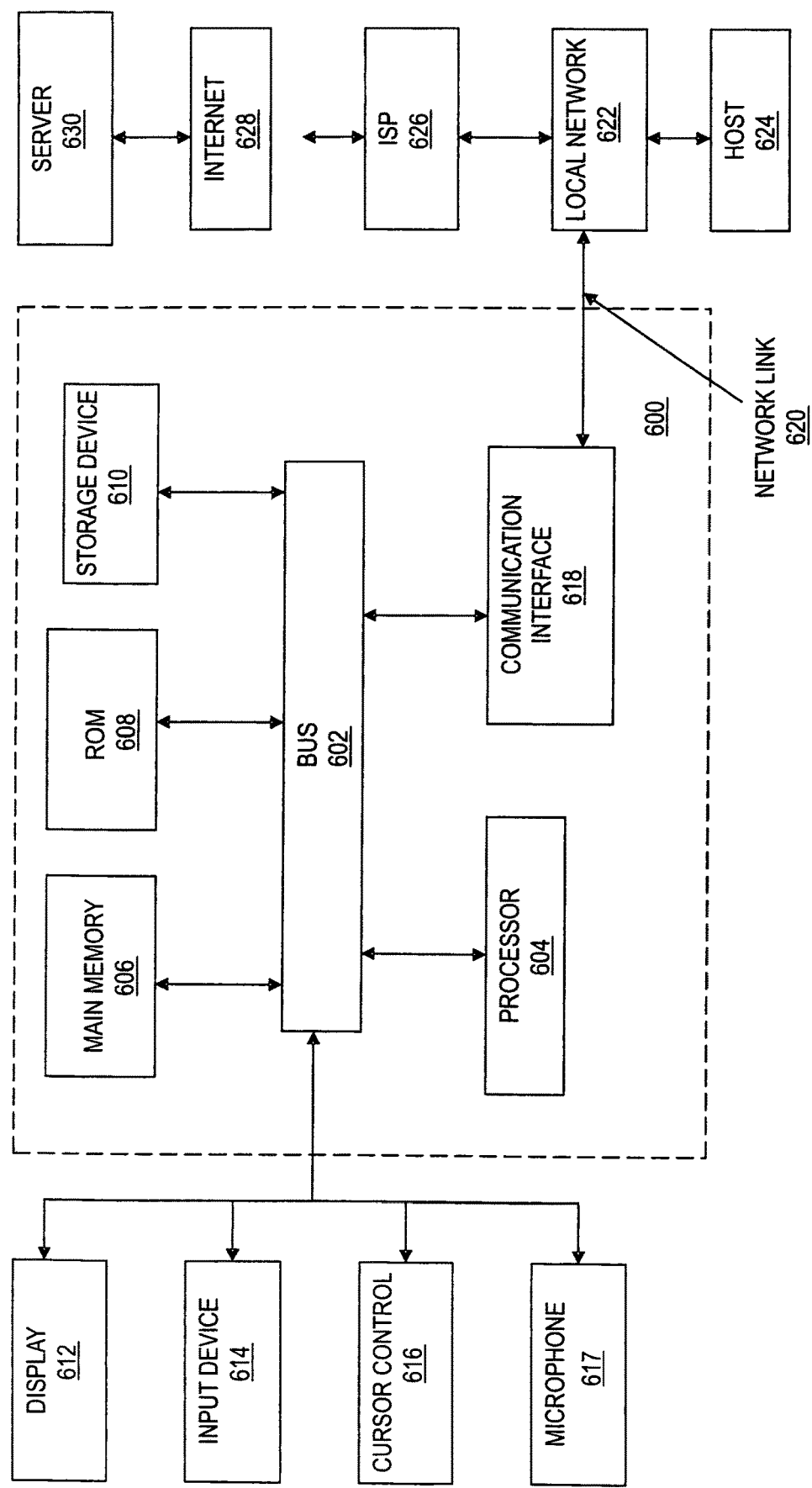
FIG. 6 is an illustration of a block diagram of a computer system upon which above example systems and processes may be implemented.

FIG. 6 is a block diagram that illustrates a computer system 600 upon which embodiments of the invention may be implemented. Computer system 600 includes a bus 602 or other communication mechanism for communicating information, and a processor or processors 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as, for example, a magnetic disk or optical disk, is provided and coupled to bus 602 for storing information and instructions.

Computer system 600 may be coupled via bus 602 to a display 612, such as a cathode ray tube (CRT), liquid crystal display (LCD), or may be a handheld active or passive display, for displaying information to a computer user. An input device 614, including alphanumeric and other keys, is coupled to bus 602 for communicating information and command selections to processor 604. Other user input devices include cursor control 616 or microphone 617. Cursor control 616 may include one or more of any number of devices, such as, for example, a mouse, a trackball, or cursor direction keys for communicating direction information and command selections to processor 604 and for controlling cursor movement on display 612. The cursor control 616 typically has two degrees of freedom in two axes, a first axis (e.g., x) and a second axis (e.g., y), allowing the device to specify positions in a plane.

Execution of sequences of instructions contained in main memory 606 causes processor 604 to perform the process steps described above. One or more processors in a multi-processing arrangement may also be employed to execute the sequences of instructions contained in main memory 606. In alternative embodiments, hard-wired circuitry may be used in place of or in combination with software instructions and it is to be understood that no specific combination of hardware circuitry and software are required. Instructions may be provided in any number of forms such as source code, assembly code, object code, machine language, compressed or encrypted versions of the foregoing, and any and all equivalents thereof. "Computer-readable medium" refers to any medium that participates in providing instructions to processor 604 for execution and "program product" refers to such a computer-readable medium bearing a computer-executable program. The computer usable medium may be referred to as "bearing" the instructions, which encompass all ways in which instructions are associated with a computer usable medium. Computer-readable mediums include, but are not limited to, non-volatile media, volatile media, and transmission media. Non-volatile media include, for example, optical or magnetic disks, such as storage device 610. Volatile media include dynamic memory, such as main memory 606. Transmission media include coaxial cables, copper wire and fiber optics, including the wires that comprise bus 602. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. Instructions received by main memory 606 may optionally be stored on storage device 610 either before or after execution by processor 604.

Computer system 600 may also include a communication interface 618 coupled to bus 602 to provide a two-way data communication coupling to a network link 620 connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network, now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information. Thus the processing required by method of the invention described by way of example herein may be implemented on a local computer utilizing storage device 610 or may be implemented, for example, on a LAN or over the Internet.

Computer system 600 can send messages and receive data, including program code, through the network(s), network link 620, and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

This application incorporates by reference, in its entirety, the following U.S. Patent Applications: "Mobile Core Client Architecture," by Marc Chéné, Liam Peyton, Kevin McGuire, and Brant Drummond, assigned Ser. No. 60/884,785, "Method And System For Customizing A Mobile Application Using A Web-Based Interface," by Mitch A. Brisebois, Brant Drummond, Arjun Mehta, Marc Chéné, and Mark Flannigan, assigned Ser. No. 60/880,170, and "Methods And System For Orchestrating Mobile Content Captures And Context Sharing With Mobile Applications And Services," by Marc Chéné, Liam Peyton, Kevin McGuire, and Brant Drummond, assigned Ser. No. 60/880,334.

This application expressly incorporates herein by reference, in its entirety, U.S. Published Patent Application Nos. US2006161646, entitled "Policy-Driven Mobile Forms Applications," published Jul. 20, 2006, US20060080397, entitled "Content Management Across Shared, Mobile File Systems," published Apr. 13, 2006, and 20060089938, titled "Distributed Scalable Policy Based Content Management," published on Apr. 27, 2006, each of which are assigned to TrueContext Corp. of Ottawa, Canada. This application also expressly incorporates herein by reference, in its entirety, International Publication No. WO 2004/013782 A1, titled "Contextual Computing System," published on Feb. 12, 2004, which is assigned to TrueContext Corp. of Ottawa, Canada.

While the presently disclosed concepts have been described with reference to one or more particular embodiments, those skilled in the art will recognize that many changes may be made thereto without departing from the spirit and scope of the presently disclosed concepts. Any combination and/or sub-combination of the examples, embodiments, aspects, claims, methods, acts, processes, claim elements, or components disclosed herein, however termed, are expressly contemplated as falling within the present concepts. For example, although various aspects of the present concepts are set forth in the appended claims, wherein the dependent claims relate back to selected preceding claims, including the independent claim, it is to be understood that each of the dependent claims may properly depend from any of the preceding claims, to the extent not logically excluded, in accord with aspects of the present concepts. Thus, for example, the present concepts expressly include every possible combination of dependent claims with their respective independent claim, regardless of stated dependency. Further, the presently disclosed concepts are considered to include, without limitation, any combination and/or sub-combination of the disclosed examples, embodiments, aspects, claims, methods, acts, processes, claim elements, or components disclosed herein with the examples, embodiments, aspects, claims, methods, acts, processes, claim elements, or components disclosed in the references and applications incorporated by reference herein.

What is claimed is:

1. A method for aggregating, obtaining, and displaying real-time data collected from multiple integrated mobile devices, the method comprising:

collecting data on said integrated mobile devices in data records using a data collection application, wherein said data collection application comprises a mobile form application;

submitting said data records from said integrated mobile devices to a gateway using said data collection application, said gateway providing a central communications point between said integrated mobile devices and a plurality of data sources, said gateway preserving the native security of said plurality of data sources, said integrated mobile devices authenticating against said gateway to said data records;

encrypting, via said gateway, said data records;

routing via said gateway copies of said data records to one of said integrated mobile devices according to a policy stored on said gateway;

combining tracking data relating to routing and processing of said data records into said data records;

combining data collected on said integrated mobile devices into said data records and then resubmitting said data records to said gateway for further routing and combining;

saving said data records on one of said integrated mobile devices;

aggregating in real-time, information from the data records containing said tracking data with other saved data records on said one of said integrated mobile devices;

obtaining said real-time data on one of said integrated mobile devices; and displaying said real-time data on a graphically based interface on said one of said integrated mobile devices, wherein said real-time data comprises data relating to mobile device users collecting and submitting said data records using said data collection application.

2. The method of claim 1, wherein said submitting occurs via a mounting client or an explorer client.

3. The method of claim 1, wherein said routing occurs via a mounting client or an explorer client.

4. The method of claim 1, further comprising displaying on said at least one receiving device in real-time aggregate information from said saved data record containing said tracking data.

5. The method of claim 1, wherein said routing of copies of said data record, said combining of tracking data into said data records, and said aggregating of information from the data records containing said tracking data with other saved data records are specified by declarative policies processed by said gateway.

6. The method of claim 1, further comprising:
performing a statistical analysis on said saved data records and the aggregated information; and
displaying the statistical analysis on at least one of said integrated mobile devices.

7. The method of claim 1, wherein said tracking data includes performance metrics.

8. The method of claim 1, wherein said data collection application includes a mobile forms application that defines a particular set of data records and a particular set of devices that can participate in said mobile forms application as well as a set of declarative policies.

9. The method of claim 8, wherein said declarative policies include one or more of routing policies, combining policies and aggregation policies.

10. The method of claim 1, comprising integration of said integrated mobile devices by routing of a form from one dispatcher to another dispatcher.

11. A system for aggregating, obtaining, and displaying real-time data collected from multiple integrated mobile devices that collect data into data records, the system comprising:
a gateway adapted to be coupled to said multiple integrated mobile devices for receiving said data records collected from said devices using a data collection application and combining tracking data relating to routing and processing of said data record into said data records, wherein said data collection application comprises a mobile form application; said multiple integrated mobile devices being coupled to said gateway for submitting said data records using said data collection application to said gateway so that said gateway can combine combining tracking data relating to routing and processing of said data record into said data record, wherein said gateway is adapted to encrypt said data records received from said devices;

receiving from said gateway, according to a policy stored on said gateway, real-time copies of said data records, combining data collected on said receiving devices into said data records, and then resubmitting said data records to said gateway for further routing and combining, wherein said gateway and said integrated mobile devices:

save said data records, and aggregate in real-time information from said data records containing said tracking data with other saved data records on said gateway;

obtain the real-time data on one of said integrated mobile devices; and display said real-time data on a graphically based interface on said one of said integrated mobile devices, wherein said real-time data comprises data relating to mobile device users collecting and submitting said data records using said data collection application, and wherein said integrated mobile devices are programmed to display in real-time aggregate information from said saved data record containing said tracking data; and wherein said gateway providing a central communications point between said integrated mobile devices and a plurality of data sources, said gateway preserving the native security of said plurality of data sources, said integrated mobile devices authenticating against said gateway to said data records.

12. The system of claim 11, wherein said submitting saved data records occurs via a mounting client or an explorer client.

13. The system of claim 11, wherein said receiving real-time copies of said data records occurs via a mounting client or an explorer client.

14. The system of claim 11, in which said integrated mobile device is programmed:
to perform statistical analysis on said saved data records and the aggregated information; and
to display the statistical analysis on said at least one receiving device.

15. The system of claim 11, wherein said tracking data includes performance metrics.

16. The system of claim 11, wherein at least one of said mobile devices includes a forms application that defines a particular set of data records and a particular set of devices that can participate in the application as well as a set of declarative policies for the application.

17. The system of claim 16 wherein said declarative policies include one or more of routing policies, combining policies and aggregation policies.

18. The system of claim 11, comprising integration of said integrated mobile devices by routing of a form from one dispatcher to another dispatcher.

* * * * *